(12) United States Patent
Agarwal et al.

(10) Patent No.: US 12,726,410 B2
(45) Date of Patent: Sep. 1, 2026

(54) PREDICTIVE NORMALIZATION FOR BLOCKCHAIN RESOURCE MANAGEMENT

(71) Applicant: Celligence International LLC, Guaynabo, PR (US)

(72) Inventors: Pavan Agarwal, Dorado, PR (US); Gabriel Albors Sanchez, San Juan, PR (US); Jonathan Ortiz Rivera, San Juan, PR (US); Thomas Smith, Guaynabo, PR (US)

(73) Assignee: Celligence International LLC, Guaynabo, PR (US)

( * ) Notice: Subject to any disclaimer, the term of this patent is extended or adjusted under 35 U.S.C. 154(b) by 226 days.

(21) Appl. No.: 18/773,357

(22) Filed: Jul. 15, 2024

(65) Prior Publication Data

US 2025/0023794 A1 Jan. 16, 2025

Related U.S. Application Data

(60) Provisional application No. 63/526,638, filed on Jul. 13, 2023.

(51) Int. Cl.
*H04L 41/0897* (2022.01)
*G06Q 20/22* (2012.01)
(Continued)

(52) U.S. Cl.
CPC ....... *H04L 41/0897* (2022.05); *G06Q 20/223* (2013.01); *H04L 9/50* (2022.05); *H04L 41/16* (2013.01); *H04L 67/10* (2013.01)

(58) Field of Classification Search
CPC ..... G06Q 20/223; H04L 9/50; H04L 41/0897; H04L 41/16; H04L 67/10
(Continued)

(56) References Cited

U.S. PATENT DOCUMENTS

| | | | |
|---|---|---|---|
| 9,575,670 | B1 | 2/2017 | Guo |
| 2021/0174349 | A1 | 6/2021 | Mehta et al. |

(Continued)

FOREIGN PATENT DOCUMENTS

| | | | | |
|---|---|---|---|---|
| CN | 109639837 A | | 4/2019 | |
| EP | 4554143 A1 | * | 5/2025 | ............ G06F 21/64 |

OTHER PUBLICATIONS

PCT International Search Report and the Written Opinion mailed Sep. 30, 2024, issued in related International Application No. PCT/US2024/038088 (14 pages).

(Continued)

*Primary Examiner* — Wodajo Getachew
(74) *Attorney, Agent, or Firm* — Sheppard Mullin Richter & Hampton LLP

(57) ABSTRACT

Systems and methods are provided for leveraging a normalization algorithm to optimize resource allocation dynamically. The algorithm detects deviations that indicate potential increases in demand. This predictive capability allows the system to scale resources proactively, adding signer nodes when necessary to handle increased transaction volumes. By normalizing transaction data and using it to predict and respond to changes in system demand, blockchain networks can maintain optimal performance and efficiency, preventing service degradation and ensuring scalability in a cost-effective manner.

14 Claims, 6 Drawing Sheets

(51) Int. Cl.
*H04L 9/00* (2022.01)
*H04L 41/16* (2022.01)
*H04L 67/10* (2022.01)

(58) Field of Classification Search
USPC ........................................................ 705/64
See application file for complete search history.

(56) References Cited

U.S. PATENT DOCUMENTS

2022/0230103 A1* 7/2022 Bansal ................. G06Q 10/063
2023/0088674 A1 3/2023 Lee
2023/0131813 A1* 4/2023 Goel ..................... H04L 9/3247
705/75
2023/0186290 A1 6/2023 Navon et al.
2023/0239200 A1* 7/2023 Motylinski ......... H04L 41/0803
709/220
2024/0323081 A1* 9/2024 Sharma .................. H04L 41/16

OTHER PUBLICATIONS

Oliveira et al., "Analyzing transaction confirmation in ethereum using machine learning techniques," ACM Sigmetrics Performance Evaluation Review, 48(4):12-5, May 19, 2021.

* cited by examiner

FIG. 2

PREDICTIVE NORMALIZATION FOR BLOCKCHAIN RESOURCE MANAGEMENT

RELATED APPLICATIONS

This application claims the benefit of U.S. Provisional Application No. 63/526,638 filed on Jul. 13, 2023, the contents of which are incorporated herein by reference in its entirety.

TECHNICAL FIELD

The present disclosure generally relates to distributed ledger computer systems. More particularly, the present disclosure relates to computer systems and processes for dynamic allocation and management of network resources.

BACKGROUND

A digital asset is a catch-all term for assets that exist digitally. The term covers a wide variety of assets, including cryptocurrencies, utility tokens, security tokens, digital stocks, and digital collectables. All cryptocurrencies are digital assets, while not all digital assets are cryptocurrencies. Digital assets are typically stored, transferred, and secured using computer systems and networks.

Blockchain, on the other hand, is a specific technology that enables the secure and transparent management of digital assets. It is essentially a decentralized and distributed digital ledger that records transactions across multiple computers or nodes. Instead of having a central authority, such as a bank or a government, controlling the ledger, blockchain relies on a consensus mechanism among participants to validate and verify transactions.

A blockchain consists of a chain of blocks, where each block contains a batch of transactions. These blocks are linked together using cryptographic hashes, forming a continuous and tamper-evident chain. Once a block is added to the blockchain, it becomes very difficult to alter or remove the information it contains, making the blockchain highly secure and immutable. Blockchain operates on a peer-to-peer network, where multiple participants (nodes) maintain and validate the ledger collectively. This decentralized nature eliminates the need for intermediaries and central authorities, reducing the risk of single points of failure or control. The blockchain ledger is transparent, meaning that all participants can view the entire transaction history. This transparency fosters trust and accountability, as any changes made to the blockchain can be easily detected and traced. Blockchain uses cryptographic techniques to secure the data stored within each block. Each block contains a unique hash, which is generated based on the information it contains. Any modifications to the block would require recalculating the hash, which would be computationally expensive and easily detectable.

Blockchain employs consensus mechanisms to ensure that all participants agree on the state of the ledger of the blockchain and validate transactions. Various consensus algorithms, such as, for example, Proof of Work (POW) or Proof of Stake (POS), can be used to validate and verify transactions before they are added to the blockchain.

Methods are needed that allow automated solutions for increasing the number of validator nodes to support transaction number increases within a distributed ledger network and to allow users to use natural language commands when interacting with a node management application assisted an automated software assistant (AA), a computer program that utilizes artificial intelligence and natural language processing to provide assistance to users via a chat interface when facilitating management of validator nodes.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 2 illustrates an exemplary schematic diagram of a computer-based architecture of an exemplary apparatus of the automated node management system of FIG. 1, according to an implementation of the disclosure.

Figure 1:
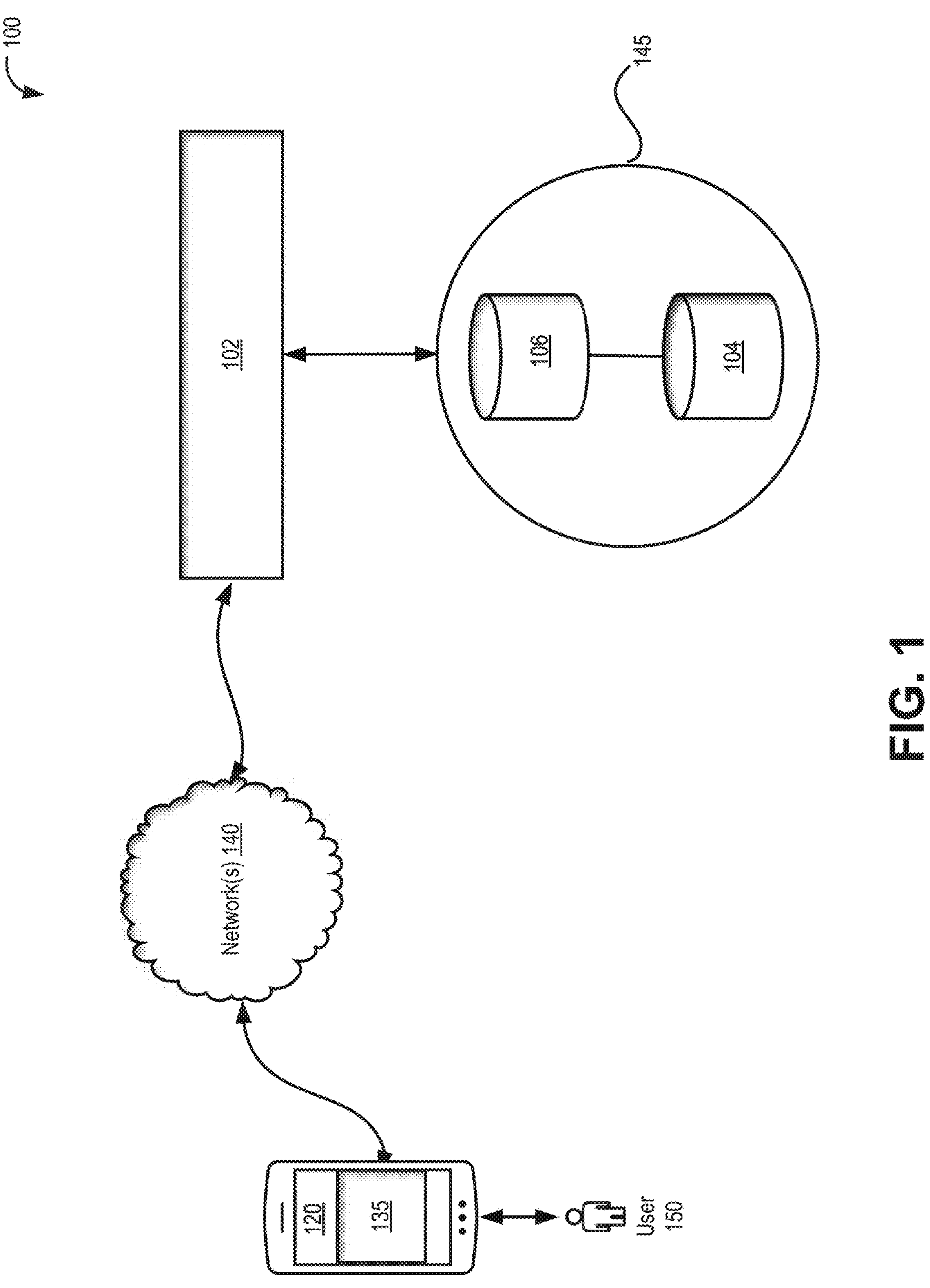
FIG. 1 illustrates an example automated node management system, according to an implementation of the disclosure.

Described herein are systems and methods for leveraging normalization algorithms to optimize resource allocation dynamically which allows the system to scale resources proactively, adding signer nodes when necessary to handle increased transaction volumes. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

DETAILED DESCRIPTION

As alluded to above, a blockchain is decentralized, immutable (unchangeable), digital ledger shared across a peer-to-peer network. Acting as a database, a blockchain causes transaction data to be permanently recorded, stored, and encrypted onto the "blocks" that are then "chained" together. A block is a data structure that encapsulates a set of transactions that are cryptographically signed, validated by the network, and permanently recorded. Blocks are the building blocks of the blockchain, ensuring the system's integrity, security, and continuity. Thus, in a blockchain, each block contains a list of transactions and is linked to the previous block through cryptographic hashes, forming a continuous chain of blocks. This interconnected structure ensures the integrity and security of the data within the blockchain.

The physical or electronic devices (e.g., computing devices, typically) that maintain copies of the blocks in a blockchain system, are called nodes. Each node communicates with other nodes to ensure that the network remains secure and up to date. The more nodes a blockchain hosts, the more decentralized it will be. This is because a larger number of nodes distributed across various locations reduces the risk of any single entity gaining control over the network. Decentralization should be viewed as a spectrum rather than a binary condition. Different blockchain networks can have varying levels of decentralization depending on the number of nodes, the distribution of those nodes, and the governance mechanisms in place. From a technical standpoint, having a healthy number of nodes spread across unique geographic locations is crucial for achieving decentralization. This distribution helps to ensure that the network remains resilient and secure, preventing any single point of failure or concentration of power.

Nodes are the custodians of the blockchain, storing encrypted data of past transactions while taking on new blocks for scalable growth. There are three main purposes a node fulfills: maintenance, validation, and accessibility. However, the effectiveness and reliability of these functions depend on the nodes being "honest" and following the network's protocols. In a majority-rule system, honest nodes outnumber attacker nodes, making it more challenging for malicious entities to infiltrate or disrupt the network.

For example, all nodes help maintain the blockchain by keeping copies of the ledger synchronized. This involves storing encrypted data of past transactions and updating the ledger with new blocks. All nodes can participate in the validation process, but the specific role of validator nodes (or consensus nodes or validators) is to ensure transactions and blocks comply with the network's rules. In addition to validating transactions, validator nodes or consensus nodes are responsible for creating new blocks and reaching an agreement on the state of the blockchain. Honest nodes correctly validate these transactions, while dishonest nodes might attempt to validate invalid transactions. Finally, all nodes provide access to the blockchain, allowing users to interact with the network, query transaction histories, and submit new transactions.

As alluded to above, validator nodes or consensus nodes are crucial for maintaining the blockchain's integrity and consensus. These nodes validate transactions, create new blocks, and reach consensus on the state of the blockchain, ensuring the network remains secure and trustworthy. Consensus is reached through a process that ensures all participating nodes agree on the same state of the blockchain. This process varies depending on the specific consensus algorithm being used. In the context of a distributed system, e.g., blockchain, a distributed consensus algorithm refers to achieving agreement among nodes in a distributed system. Thus, distributed consensus algorithms address the unique challenges of distributed environments, ensuring consistency, reliability, and fault tolerance across a network of geographically dispersed nodes.

Different consensus algorithms may be used to reach consensus, e.g., popular consensus algorithms include proof of work (PoW), proof of stake (POS), delegated Proof of Stake (DPoS), and Proof of Authority (PoA). In PoW-based blockchains (e.g., Bitcoin), consensus is reached through competitive mining, where the longest chain with the most computational work is considered the valid chain. In PoW, validator nodes are referred to as mining nodes or miners. Miners compete to solve complex mathematical puzzles through computational work. Once a miner successfully solves the puzzle, they can add a new block to the blockchain and receive the associated rewards. In PoS-based blockchains, consensus is achieved by selecting validators based on their stake, who then propose and attest to new blocks. Finalization occurs once enough validators have attested to a block. In PoS, validator nodes called staking nodes validate transactions and create new blocks based on the amount of cryptocurrency they hold and lock up as collateral. Staking nodes are chosen to create new blocks and validate transactions based on the amount of cryptocurrency they are willing to "stake" or lock up. The higher the stake, the higher the chances of being selected as a validator. In DPOS-based blockchains, consensus is reached through the election of delegates who take turns producing and validating blocks. Governance is maintained by token holders voting for delegates. A token holder is an individual or entity that possesses tokens (e.g., digital assets) in a blockchain network. In DPOS, token holders in the network vote for these delegates, and the top vote recipients become validators. The voting power is proportional to the amount of cryptocurrency held by the token holders. Validators take turns producing blocks in a predetermined order based on the votes they receive.

Finally, Proof of Authority (PoA)-based blockchains, validator nodes are typically preselected and known entities. These nodes are trusted authorities responsible for validating transactions and creating new blocks. The consensus is achieved through the identity and reputation of the validators rather than through computational or stake-based mechanisms.

While validator nodes generally have a more comprehensive role in the consensus and validation processes, a more specialized node called a signer node is responsible for signing transactions or blocks. Signer nodes are often used in contexts where the emphasis is on the signing process, such as in multi-signature wallets or certain PoA networks discussed herein.

The number of validator nodes can vary depending on the blockchain network. Some blockchains have a limited set of validators, while others have a more open and decentralized approach with a larger number of nodes participating in the validation process.

"Scale" or "scaling" refers to the ability of a system, network, or process to handle a growing amount of work or to accommodate an increase in workload efficiently. In blockchain networks, scaling is a particularly crucial topic due to the inherent limitations of most blockchain networks in terms of transaction throughput and latency. Blockchain scaling solutions aim to increase the number of transactions the network can process per second (tps) and reduce the time it takes for transactions to be confirmed. Scaling ensures that as demand increases, the system can continue to operate efficiently without degradation in performance.

One way to scale out a blockchain network involves adding more validator or miner nodes to increase transaction processing capacity. For example, an increase in demand (e.g., by measuring transaction volume, network usage, active addresses, smart contract activity, dApp usage, market indicators, user base growth, and development activity) typically requires an increase in the number of nodes to maintain performance, security, and decentralization. More nodes help distribute the workload, enhance security, provide redundancy, and ensure the network remains robust and decentralized. Different consensus mechanisms have varying implications for how nodes are added and managed, but the overall goal is to scale the network to meet growing demand while preserving its core attributes.

The management of the number of validator nodes in a blockchain network depends on the specific design and governance of the network. The decision-making process regarding the number of validator nodes can vary based on factors such as the consensus mechanism, network scalability, decentralization goals, and the specific requirements of the blockchain application. For example, some blockchain networks have a fixed number of preselected validators who are responsible for maintaining the network consensus. These validators are typically chosen based on their reputation, expertise, or stake in the network. The number of validators remains constant over time, ensuring a consistent and controlled validation process. In other blockchain networks, the validator set can change dynamically. This means that new validators can join the network or existing validators can be removed. The selection process can be based on various criteria such as stake size, voting by token holders, or other mechanisms defined by the consensus algorithm. This approach allows for greater decentralization and flexibility in the validator set.

Management of validator nodes involves trade-offs between decentralization, security, scalability, and network efficiency. Blockchain networks aim to strike a balance based on their specific goals and requirements. The chosen approach for managing validator nodes depends on the consensus algorithm and the governance structure of a particular blockchain network. For example, some systems control voting nodes by preemptively increasing their number to account for traffic and use spikes. However, this approach fails to accommodate a sudden increase in traffic thereby causing system outages.

Traditional blockchain networks often rely on fixed or manually adjusted validator nodes. These methods may lead to inefficiencies and vulnerabilities as network demand fluctuates. Accordingly, networks that rely on human intervention may face system degradation. Often, existing networks take a decentralized approach when decisions regarding the network's rules, policies, and operations. are made by participants (or peers) in the network collectively. This peer-driven governance model leverages the input and consensus of a distributed community rather than a centralized authority. As the number of participants grows, reaching consensus can become more complex and time-consuming, potentially slowing down decision-making processes. Thus, this type of governance runs the risk of falling behind their growing baseline activity and halting activity for days or weeks. Finally, some blockchain networks use incentives to encourage voter node creation. However, even with incentives, voting can take a great deal of time for a meaningful change to take place.

The presently disclosed automated system for scaling validator nodes can address these issues by dynamically adjusting the network's capacity. By using a process configured to evaluate whether more validation is required to run at an optimal pace allows the system to be scaled automatically thereby ensuring the system performs without outages and can handle any number of transactions. This automated approach contrasts with existing peer-driven governance models, which risk delays and interruptions, as explained above. The present system does not require the network to agree because all the voting participants vote together and on time, such that no degradation of service is possible.

By creating a system that can automatically detect the need and/or anticipate the need and increase the number of voting nodes allows the network to run at an optimal pace. The present solution uses machine learning algorithm trained on historic data to predict increases "spikes" in use to scale the number of validator nodes. Additionally, and as discussed further below the algorithm may determine projected customer growth to inform an upper boundary of nodes needed to comfortably support all the customers.

For example, a system supports 4096 pending transactions per node. Pending transactions are those that have been submitted to the blockchain network but have not yet been included in a block by miners or validators. In an exemplary system with two nodes, just under 10,000 transactions can be supported (i.e., for every node that is added, another 4096 transactions are accommodated). This two-node system can be said to support up to 8192 transactions. However, if all 10 million users send a transaction simultaneously, it would cause an increase in demand requiring a network with a capacity of approximately 2442 nodes instead of just two. Deploying 2442 nodes unduly strains system resources. Anticipating when the network will require an increase in nodes provides a significant advantage over existing systems in terms of the resources needed to support the number of validator nodes.

The machine learning algorithm may use a zero-tolerance model to determine if new nodes should be added by periodically evaluating unconfirmed transaction count. For example, a threshold may be used to evaluate whether the number of unconfirmed transactions is outside of the normal range (bound). This evaluation can occur at various intervals, such as every validator block (i.e., each time a new block is added to the blockchain by a validator node), every minute, every hour, or each time a transaction is submitted, depending on the set interval. These intervals may be dynamically adjusted based on real-time data. The process evaluates the unconfirmed transaction count, and when a threshold condition is met, the system initiates a vote to increase the number of nodes that validate transactions on the distributed ledger (i.e., blockchain). In some embodiments, the system may preemptively anticipate spikes in transaction volume by relying on historical data patterns, thereby enabling proactive scaling to maintain network performance and stability.

The zero-tolerance model is a strict approach where specific thresholds are predefined, and any deviation from these thresholds triggers an immediate action. This model ensures that certain conditions are always met without allowing for any margin of error or delay. This model ensures the blockchain network remains performant and can handle high transaction volumes without delay, reduces the risk of system degradation or failure due to high transaction loads, and dynamically allocates resources as needed, optimizing the use of validator nodes.

FIG. 1 illustrates an example automated node management system 100 for automatically scaling the number of validator nodes in a blockchain network in response to changes in network demand, in accordance with the embodiments disclosed herein. For example, the system 100 may evaluate whether more validation is required to maintain optimal operation, ensuring the blockchain network performs without outages and can handle varying transaction volumes.

In some embodiments, system 100 may include a node management server 102 and a client computing device 120, that are in communication with one or more network(s) 140. The automated node management server 102 may be in communication with a blockchain network 145. The system may include blockchain network 145 comprising nodes 104, 106. A user 150 may be associated with a client computing device 120. The user 150 may include a network administrator configured to monitor and support the blockchain network 145.

The blockchain network 145 may be a private network or a peer-to-peer open membership network which may be joined by anyone, without invitation or without consent from other members. Distributed electronic devices running an instance of the blockchain protocol under which the blockchain network 145 operates may participate in the blockchain network 145. Such distributed electronic devices may be referred to as nodes 104, 106. The blockchain protocol may be a Bitcoin protocol, or other cryptocurrency, for example.

The electronic devices that run the blockchain protocol and that form the nodes 104, 106 of the blockchain network 145 may be of various types including, for example, computers such as desktop computers, laptop computers, tablet computers, servers, mobile devices such a smartphone, wearable computers such as smart watches or other electronic devices. Nodes 104, 106 of the blockchain network 145 are coupled to one another using suitable communication technologies which may include wired and wireless communication technologies. In many cases, the blockchain network 145 is implemented at least partly over the Internet 145, and some of the nodes 104, 106 may be located in geographically dispersed locations.

Nodes 104, 106 maintain a global ledger of all transactions on the blockchain, grouped into blocks each of which contains a hash of the previous block in the chain. The global ledger is a distributed ledger and each node 104, 106 may store a complete copy or a partial copy of the global ledger. Transactions by a node 104 affecting the global ledger are verified by other nodes so that the validity of the global ledger is maintained. The details of implementing and operating a blockchain network, such as one using the Bitcoin protocol, will be appreciated by those ordinarily skilled in the art.

In some embodiments and as will be described in detail in FIG. 2, server 102 may include a processor, a memory, and network communication capabilities. In some embodiments, server 102 may be a hardware server. In some implementations, server 102 may be provided in a virtualized environment, e.g., automated customer server 102 may be a virtual machine that is executed on a hardware server that may include one or more other virtual machines. The node management server 102 may be communicatively coupled to a network 140. In some embodiments, server 102 may transmit and receive information to and from client computing device 120 via network 103. Additionally, server 102 may transmit and receive information to and from the nodes 106, 104 and/or blockchain network 145, and/or other servers.

Figure 2:
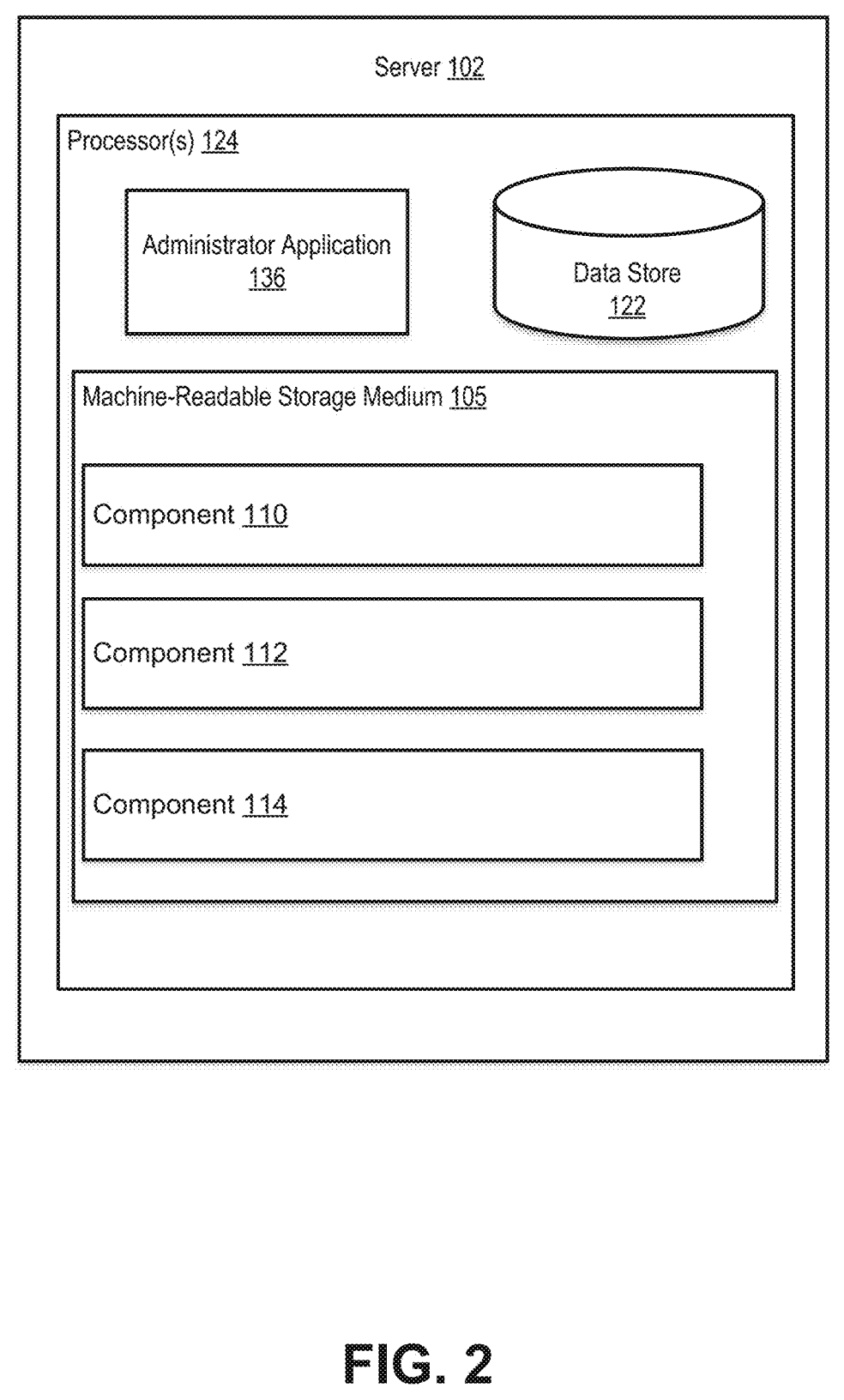

As illustrated in FIG. 2, server 102 may comprise computer program components operable by the processor to enable automated monitoring and support of the blockchain network 145. In some embodiments, server 102 may comprise computer program components operable by the processor to enable a virtual network administrator provided by application 135.

In some embodiments, client computing device 120 may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices. In some embodiments, client computing device 120 may present content to user 150 and receive user input.

In some embodiments, client computing device 120 may be equipped with GPS location tracking and may transmit geolocation information via a wireless link and network 140. In some embodiments, server 102, including application 135, may use the geolocation information to determine a geographic location associated with user 150. In some embodiments, server 102 may use signal transmitted by client computing device 120 to determine the geolocation of user 150 based on one or more of signal strength, GPS, cell tower triangulation, Wi-Fi location, or other input.

In some embodiments, a standard API can be used between components of server 102 and/or application 135.

FIG. 2 illustrates an example node management server 102 configured in accordance with one embodiment. Processor(s) 124 may be one or more central processing units (CPUs), semiconductor-based microprocessors, and/or other hardware devices suitable for retrieval and execution of instructions 110-112 stored in machine-readable storage medium 105. Processor(s) 124 may fetch, decode, and execute instructions to control processes or operations for optimizing the system during run-time. As an alternative or in addition to retrieving and executing instructions, processor(s) 124 may include one or more electronic circuits that include electronic components for performing the functionality of one or more instructions, such as a field programmable gate array (FPGA), application specific integrated circuit (ASIC), or other electronic circuits.

A computer readable storage medium, such as machine-readable storage medium 105 may be any electronic, magnetic, optical, or other physical storage device that contains or stores executable instructions. Thus, machine-readable storage medium 105 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 105 may be a non-transitory storage medium, where the term "non-transitory" does not encompass transitory propagating signals. As described in detail below, machine-readable storage medium 105 may be encoded with executable instructions, for example, instructions 110-114, and/or for running various processes and engines described throughout the disclosure.

In some embodiments, as alluded to above, automated node management server 102 may include a distributed application 136 and a corresponding client conversation application (e.g., application 135 illustrated in FIG. 1). The corresponding client network administrator application may be configured to provide client functionality to enable user 150 to review network alerts, scaling implementations, and communicate with server 120 on client computing device (e.g., device 120 illustrated in FIG. 1).

In some embodiments, distributed network administrator application 136 may be operable by one or more processor(s) 124 configured to execute computer readable instructions 105 comprising applications, engines, or modules, including computer program components. In some embodiments, the computer program components may include one or more of a node normalizing component 110, node analysis component 112, and a node scaling component 114, and/or other such components.

Referring back to FIG. 1, automated node scaling management server 102 may be in communication with a blockchain network 145. The blockchain network 145 may include nodes 104, 106. In some embodiments, blockchain network 145 includes a plurality of validator nodes, including nodes 104, 106. The validator nodes 104, 106, may be physically and logically distributed throughout the network 145.

In other embodiments, nodes 104, 106 may comprise nodes of different types or categories, depending on their functionality, e.g., wallet nodes, mining nodes, full blockchain maintenance nodes, and network routing nodes. There may be variations of these functions. For example, wallet nodes primarily handle wallet services, such as creating transactions; mining nodes participate in the mining process (in PoW systems); full blockchain nodes maintain a complete copy of the blockchain ledger and validate all blocks and transactions; and routing nodes facilitate network communication by relaying information between nodes.

Nodes 104, 106 may have more than one function. For example, a "full node" may offer all four functions. By contrast, lightweight nodes do not store the entire blockchain but typically perform essential functions, such as wallet functions (e.g., managing the user's wallet, creating, and signing transactions) and/or network routing (passing on transactions and blocks without validating or storing the entire chain). It will be understood that the blockchain network 145 may include a number of other types of nodes, including full nodes, simplified payment verification (SPY) nodes (e.g., wallets), and other specialized nodes having a focused role.

In one embodiment, blockchain 145 may use Unspent Transaction Output (UTXO) model, such as Bitcoin. As alluded to above, nodes 104, 106 may process transactions within the blockchain 145. Each transaction typically has one or more inputs and one or more outputs. Scripts embedded into the inputs and outputs specify how and by whom the outputs of the transactions can be accessed. The output of a transaction includes an address to which value is transferred as a result of the transaction. This value is then associated with that output address as an unspent transaction output (UTXO). For example, users may initiate transactions by specifying the recipient, amount, and attaching a digital signature to prove their authority to send the amount. Once created, the transaction is broadcast to the network. Nodes (e.g., nodes 104, 106) receive and propagate the transaction to other nodes, ensuring that all nodes in the network eventually receive the transaction data. These nodes check the digital signature to confirm that the transaction was indeed authorized by the holder of the funds. They also ensure that the same coins haven't been spent twice, which is critical in UTXO-based systems like Bitcoin. Moreover, nodes verify that the inputs reference valid and unspent outputs from previous transactions and that the sum of inputs meets or exceeds the sum of outputs; any excess is treated as a transaction fee for the miner. Validated transactions are stored in the node's transaction pool, often called the mempool, while they await confirmation by inclusion in a block, thus remaining unconfirmed transactions until then. The mempool has a finite capacity, determined by the node's configuration. This capacity can be based on memory limits, the number of transactions, or other criteria. The capacity ensures that the node does not get overwhelmed by an excessive number of pending transactions, which could degrade performance or lead to other issues. A subsequent transaction may then reference the UTXO as an input to spend or disperse that value.

When the mempool reaches its capacity, nodes may start dropping the least prioritized transactions (typically those with the lowest fees) to make space for new, higher-priority transactions. Some nodes may also implement algorithms to manage mempool overflow more effectively, such as dynamically adjusting the fee threshold for transaction inclusion.

As alluded to earlier, a signer node is a specialized node. In a private blockchain network (e.g., one that is using a PoA consensus mechanism), a signer node is an entity authorized to validate transactions and produce blocks. In some embodiments, signer notes may be a software node that validate transactions and initiate/cast votes.

These nodes may also have the capability to participate in governance votes, such as those proposing the addition of new signer nodes. As explained above, unconfirmed transaction count refers to the number of transactions broadcast to the network but not yet included in a block. Governance votes in such networks typically involve proposals and are not directly triggered by transaction volumes. As the number of signer nodes increases, the network's capacity to handle more transactions can improve, assuming the network's architecture supports this scalability.

The presently disclosed system is configured to provide a solution designed for managing the scalability of a blockchain network through dynamic control of signer nodes based on network demand, particularly using transaction volume as a trigger for governance actions. For example, the AI-driven approach to scaling through the use of normalization algorithms and win conditions allows for a robust, responsive, and scalable system. This ensures optimal network performance even under varying loads, maintaining the integrity and responsiveness of blockchain operations.

In an exemplary embodiment, the presently disclosed system is configured to manage all the signer nodes and dynamically scale based on network demand. For example, the system may automatically initiate a governance vote to add a new signer node when the number of unconfirmed transactions exceeds the capacity that the current collection of nodes can effectively process on the distributed ledger.

For example, in a blockchain network that is utilizing signer nodes, such as those with a PoA consensus mechanism, every transaction initiated within the ledger remains unconfirmed until selected and processed by one of the signer nodes. These nodes validate the transactions and include them in a new block to be added to the blockchain.

In some embodiments, node normalizing component 110 illustrated in FIG. 2, may utilize a "normalizing algorithm" used to evaluate unconfirmed transactions when determining if scaling up the number of nodes is necessary.

In some embodiments, the normalization algorithm may be configured to find the 'normal', which can be thought of as an average without the most extreme outlier scores. Using this 'normal' allows the system to determine deviations and predict potential increases in system demand. This approach reduces the need for manual intervention based on anticipated social or economic events, thereby optimizing sysadmin time and resources. This is akin to stocking a restaurant kitchen based on monthly patterns or collecting foot traffic data to determine optimal business hours and inventory needs, such as having extra soup on busy days.

In some embodiment, this normalizing algorithm may be configured to score unconfirmed transactions by normalizing the current count (U) between a minimum ($U_{min}$) and maximum ($U_{max}$) expected range, represented as $$U^1 = \frac{(U - U_{min})}{(U_{max} - U_{min})}.$$

This score helps determine when to scale the number of verifying nodes.

In some embodiments, a zero-tolerance policy towards unconfirmed transactions may be applied, where any significant increase in $U^1$ may lead to rapid scaling. For example:

$$U^1 = \frac{(1-0)}{(1-0)} = 1,$$

indicates a full capacity of unconfirmed transactions, thus meeting a win condition that triggers the system to scale up. Care is essential to avoid overly aggressive scaling that could lead to denial of service due to the unwieldy creation of signer nodes.

A specific 'win condition' is set within the system to trigger scaling actions. For example, a win condition, may be defined as achieving a system load score of 5 or higher, calculated using the normalization formula, as described above. When the win condition is met or exceeded, it indicates that the existing node configuration can no longer efficiently handle the transaction load. Accordingly, meeting the win condition triggers automated response within the network.

In some embodiments, the response to this condition may include network address generation. For example, upon meeting the win condition, the system automatically generates a new network address. This address is provisioned specifically to accommodate the increased transaction volume. Next, the new address is designated as a signer node. This node is endowed with responsibilities for validating transactions, playing a vital role in maintaining the integrity and efficiency of the blockchain. Finally, provisioning and operational setup of the new signer node may be seamlessly handled within cloud-based environments. This includes popular platforms such as AWS, Google Cloud, and Microsoft Azure, ensuring that the node is operational with minimal setup time and can scale dynamically with the network demands. In another embodiments, the system also considers more tolerant conditions for scaling, such as:

$$U^1 = \frac{(10-0)}{(10-0)} > \frac{U^1}{2}$$

If $U^1$ reaches 10 and is more than half of $U_{max}$ (5 in this case), this scenario also constitutes a win condition, as the score is significantly higher than 0.5, the threshold set for half the maximum possible value. In this case, the score is clearly above 5, triggering the automated response to add a new signer node to handle the increased load.

In some embodiments, the choice of threshold may be determined based on one or more specific requirements, objectives, and operational dynamics of the system. For example, the system may use system capacity, cost efficiency, load variability, historical data and predictive analytics, and even type of workload when determining the threshold.

In some embodiments, the threshold may reflect the system's capacity to handle load without degrading performance. For example, setting it at half the maximum might be conservative, aiming to ensure the system scales before reaching a point where performance is compromised. However, depending on the system's resilience and efficiency, this threshold may be adjusted higher or lower. In environments where load can spike unpredictably, a lower threshold might be more suitable to allow earlier scaling and thus avoiding potential bottlenecks. In more stable environments, a higher threshold could be more cost-effective and still maintain performance.

In some embodiments, the system may employ one or more algorithms that adapt the threshold based on recent activity levels and predictions, potentially using machine learning to optimize this parameter continuously.

Further enhancing decision-making, the system compares the current normalized value ($U^1$) against the previous set of normalized values ($U^0$), employing min-max normalization represented in the following formulation:

$$U^1 = \left(\frac{\left(U^0 - U^0_{min}\right)}{\left(U^0_{max} - U^0_{min}\right)} < \frac{U^1}{2}\right) : \left(\frac{(U - U_{min})}{(U_{max} - U_{min})} > \frac{U^1}{2}\right)$$

This comparative approach allows the system to adapt based on both historical and current transaction loads, improving the responsiveness and efficiency of the network.

In a two-node exemplary embodiment, a node can support 4096 pending transactions per node. Pending transactions are unconfirmed transactions that have been submitted to the blockchain network but have not yet been included in a block by miners or validators. Each node queues up to 1024 transactions. Queued transactions are those waiting to be processed as pending transactions. Once validated, these transactions move to the pool of pending transactions, which can hold up to 4096 transactions at a time. With two nodes, the network can handle 2048 queued transactions (1024 per node) and 8192 pending transactions (4096 per node) in total. The network begins to experience serious service degradation when the combined capacity exceeds 2048 queued and 8192 pending transactions. When the number of pending transactions exceeds 4096, the node will start to overwrite older pending transactions, causing those transactions to fail.

In some embodiments, the normalization algorithm may be used when normalizing the pending transaction count to a value between 0 and 1, reflecting the proportion of the node's capacity that is being used.

The algorithm may use the following formula:

$$P^1 = \frac{P}{P_{max}},$$

where $P^1$ represents a score calculated based on the normalized transaction count, representing how this count compares to normal operating conditions, p is the current pending transaction count (as set by txpool_content.pending), $P_{max}$ is the maximum set amount of pending transactions for a node (default 4096 as set by txpool.globalslots, and 4096 is the maximum number of pending transactions per node. Thus, if p=0, then $P^1$=(0/4096)=0, if p=64, then $P^1$=(64/4096)=0.0156, if p=128, then $P^1$=(128/4096)=0.0313, if p=256, then $P^1$=(256/4096)=0.0625, if p=512, then $P^1$=(512/4096)=0.125, if p=1024, then $P^1$=(1024/4096)=0.25, if p=2048, then $P^1$=(2048/4096)=0.5, and if p=4096, then $P^1$=(4096/4096)=1.

In some embodiments, the data (i.e., normalized pending transaction count) may be stored in a structured table (e.g., in datastore 122 illustrated in FIG. 1) allowing the system to easily track and analyze the performance and load on each node over time. For example, node analysis component 112 illustrated in FIG. 2, may be configured to track pending transaction data at regular intervals (e.g., by the hour or by the block), and store it in a PostgreSQL (or SQL variant) table called pending. In some embodiments, the table structure is as follows: ID is an integer representing the node number (e.g., node1, node2, etc.), timestamp representing the time in milliseconds since the UNIX epoch, count is an integer representing the pending transaction count from each individual node's txpool_content.pending value, and score representing the normalized pending transaction score, calculated using the corrected formula.

```
CREATE TABLE pending (
 ID INT,
 timestamp TIMESTAMP,
 count INT,
 score FLOAT(1, 5)
);
```

In some embodiments, the pending table which stores the normalized pending transaction count may be used to inform machine learning models. The data stored in this table includes the normalized pending transaction count, which has been sanitized and scaled to a consistent range. This normalization allows the machine learning models to preemptively make scaling decisions by identifying patterns that precede service degradation. The sanitized, normalized data may be used directly to build the training set for the machine learning model, without needing database inflection before any serious degradation of service occurs. By analyzing this normalized data, the machine learning model can establish thresholds that, when met during each evaluation, trigger the system's expansion. Thus, the system 100 can dynamically and accurately determine when scaling is necessary based on historical data and real-time analysis. While this approach is effective in a decentralized, non-service context, it is particularly valuable, as it reduces the need for manual intervention in scaling decisions, saving time, and enhancing efficiency.

In some embodiments, the scored pending transaction count can be directly used to build the training set for machine learning model to preemptively inform scaling decisions.

The machine learning algorithm may be trained on scored data comprising unconfirmed transaction counts. Scored data refers to data that has been evaluated and assigned a numerical value or score based on specific criteria or algorithms. This score is often used to quantify and categorize the data, making it easier to analyze and make decisions.

For example, scored data may include unconfirmed transaction counts to manage scaling decisions. As described above, the normalized score ($P^1$), is a score calculated based on the normalized transaction count, representing how this count compares to normal operating conditions, where the unconfirmed transaction count includes the raw number of transactions waiting to be confirmed.

In some embodiments, the unconfirmed transaction counts and timestamps may be collected from the blockchain network via an API service. The collected data may be normalized to ensure consistency and to make it comparable across different time periods and conditions. The normalized data is processed through a machine learning algorithm that assigns a score to each data point. This score reflects the transaction count's deviation from the normal range. The scores are evaluated against historical scores to identify patterns and detect anomalies. Anomalies indicate abnormal transaction volumes that could necessitate scaling actions. Based on the scored data, the machine learning algorithm can trigger actions such as initiating a vote to add new validation nodes to handle increased transaction loads.

Furthermore, machine learning models may use the collected data to establish thresholds that trigger system expansion when met. For example, the node analysis component 112 may establish thresholds by analyzing historical data of the normalized pending transaction counts, identifying patterns, and using statistical methods to determine the points at which certain actions should be taken. based on historical data and real-time analysis. These thresholds help differentiate between normal transaction volumes and suspicious spikes that may indicate malicious activity.

Figure 3:
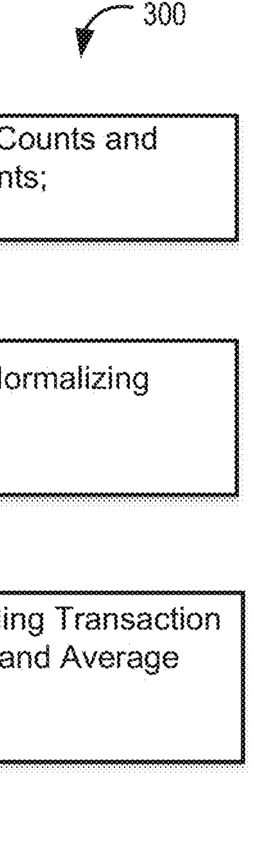
FIG. 3 illustrates a threshold establishment method executed by the automated node management system of FIG. 1, in accordance with some of the embodiments disclosed herein.

An illustrative threshold established method executed by node analysis component 112 is provided in FIG. 3. For example, at step 310 data including transaction counts, timestamps, and system performance metrics may be collected. Next, the data may be preprocessed by cleaning the data to remove any inconsistencies or noise. This might involve normalizing data (e.g., executed by component 110) to ensure it's on a consistent scale, handling missing values, and converting categorical data into numerical form.

At step 330, determine which features (variables) are most relevant to the task. For instance, relevant features might include the number of unconfirmed transactions, transaction rates, and system latency. In some embodiments, new features may be created from existing data to better capture the underlying patterns. For example, calculating the average number of transactions over different time windows.

At step 340, a suitable machine learning model may be selected (e.g., node analysis component 112 may select at least one of regression models, decision trees, and anomaly detection algorithms) and trained using preprocessed historical data. The model learns to predict the target variable, such as the likelihood of system overload or the optimal number of nodes required. Using machine learning algorithms can effectively establish thresholds by leveraging historical data, identifying patterns, and predicting future states. By doing so, they enable proactive decision-making and efficient resource management, ensuring blockchain networks remain resilient and responsive to changing conditions.

At step 350, the trained model may be executed predict future states based on current and historical data. For example, it might predict that in the next hour, the unconfirmed transaction count will exceed 90% of the node capacity.

At step 360, based on these predictions, thresholds may be established (e.g., a threshold that if the predicted count exceeds 85% of capacity, trigger a vote to add a new node). These thresholds are points at which the model suggests taking action. For example, if the model predicts that the number of unconfirmed transactions will exceed a certain number, it triggers the addition of new nodes.

In some embodiments, a threshold may be established by applying a variety of methods and techniques. In some embodiments, a threshold may be established by applying a predetermined percentile and/or value. For example, a percentile of unconfirmed transactions may be calculated and set as a threshold (e.g., 95th percentile). If unconfirmed transaction count exceeds this value, it may indicate an abnormal situation requiring action.

In other embodiments, a threshold may be established by applying moving averages to smooth out short-term fluctuations and highlight longer-term trends. For example, when the current value deviates significantly from the moving average, it could trigger an action.

In some embodiments, a threshold may be established by applying a ML algorithm to detect anomalies by node analysis component 112 of server 102. For example, when applying unsupervised learning techniques like clustering (e.g., k-means) and isolation forests can identify outliers in the data, which are treated as anomalies. These anomalies can serve as thresholds for action. Similarly, supervised learning techniques, including models trained on labeled data (normal vs. anomalous) can classify new data points and determine if they fall within normal operating ranges or need attention.

In other embodiments, threshold may be established by applying time series analysis. For example, Autoregressive Integrated Moving Average (ARIMA) models may be used to predict future points in a time series and establish confidence intervals. Values outside these intervals can serve as thresholds. Further, exponential smoothing method may be used to apply decreasing weights to past data, giving more importance to recent observations. Deviations from the smoothed trend can signal thresholds.

In some embodiments, threshold may be established by decision trees and rules-based systems. For example, a decision tree may be trained to learn the conditions under which different actions are taken. The branches of the tree represent different thresholds based on feature values.

In some embodiments, threshold may be established by defining explicit rules derived from ML insights. For example, if the unconfirmed transaction count exceeds 80% of historical peak values, the system may be configured to initiate scaling.

In some embodiments, the system 100 may be configured to leverage machine learning models and techniques and normalized data to manage the scaling of validation nodes in a blockchain network (executed by node scaling component 114), thus safeguarding against potential denial of service (DOS) attacks. This proactive approach ensures that malicious actors cannot overwhelm the network with an excessive number of requests or create too many validation nodes.

Presently, blockchain requires that transactions be valid to be considered, thus some malicious requests are thwarted by virtue of this requirement. For example, the system may determine whether a request is malicious or is a valid request for addition to the blockchain. Further, the system may determine when to add another node to the blockchain using machine learning algorithm.

Similarly, by dynamically adjusting the evaluation intervals and thresholds (when normalizing the pending transaction count), the system can quickly respond to genuine increases in transaction volume while filtering out anomalous spikes caused by malicious actors.

Machine learning models may utilize historical data to identify patterns associated with normal and abnormal activities. This allows the system to preemptively scale up or down based on predictive analysis, further enhancing its ability to prevent and mitigate DOS attacks.

In some embodiments, the system may implement several mechanisms to thwart malicious activity, including, e.g., controlled node creation, dynamic interval adjustment, and so on. For example, by using a robust voting mechanism, the system may effectively prevent the indiscriminate creation of validation nodes. This ensures that only legitimate requests for scaling are honored, thereby mitigating the risk of a DOS attack.

A robust voting mechanism in blockchain governance protects against malicious activities by ensuring secure, transparent, and fair voting processes. It leverages cryptographic techniques, consensus algorithms, and strict access controls to maintain the integrity and resilience of the network. By implementing these measures, the system can effectively prevent manipulation and ensure that scaling decisions are made in the best interest of the network's stability and performance.

In some embodiments, a robust voting mechanism safeguards against malicious activity since it is designed to ensure the integrity, security, and fairness of the voting process used for network governance decisions, such as adding new validation nodes. First, the system may ensure that only legitimate, authorized participants (nodes) can vote. This might involve cryptographic identity verification, where nodes prove their identity using digital signatures. Next, the system may implement strict access control to ensure that only nodes with the necessary permissions can participate in the voting process. The voting process should be transparent, with clear rules and procedures. All actions and results should be publicly verifiable.

In some embodiments, the system may maintain detailed logs of voting actions that can be audited to detect and investigate any irregularities. The system may utilize reliable consensus mechanism (e.g., PoS, PoA, etc.) that ensures agreement among nodes on the voting outcome. This reduces the risk of manipulation by a minority of nodes.

In some embodiments, the system may define clear thresholds for vote approval (e.g., a supermajority or two-thirds majority) to prevent easy manipulation by a small number of malicious nodes.

The system 100 may use strong encryption to protect the confidentiality and integrity of votes during transmission and storage. The system 100 may implement tamper-resistant technologies (e.g., blockchain's immutable ledger) to ensure that votes cannot be altered once cast. The system 100 may use mechanisms such as PoS or requiring significant investment (e.g., stake of cryptocurrency) to prevent Sybil attacks, where an attacker creates many fake identities to manipulate the vote. The system may ensure that each legitimate participant has an equal opportunity to vote, preventing undue influence by any single node or group of nodes.

In some embodiments, voting power might be weighted based on specific criteria (e.g., stake in the network), but these criteria should be transparent and fair. A proposal may be made to add a new validation node due to increased transaction volume. The proposal is broadcast to all authorized nodes, which then begin the voting process. Each node verifies its identity and casts a vote. The votes are encrypted and recorded on the blockchain, ensuring transparency and immutability. The consensus mechanism ensures that votes are tallied fairly. If the defined threshold (e.g., 67% approval) is met, the proposal is approved. In case of discrepancies or close votes, audit logs are reviewed to ensure the accuracy and integrity of the voting process. If approved, the system initiates the process to add the new validation node, following predefined procedures to integrate the node securely into the network.

In some embodiments, the system 100 may be configured to leverage machine learning models and techniques and normalized data to manage the scaling of validation nodes in a blockchain network (executed by node scaling component 114). For example, the machine learning algorithm may be trained on scored data comprising unconfirmed transaction counts. This algorithm scores the unconfirmed transactions and recursively evaluates them against previous scores. Because it outputs a normalized range, which is a type often used by machine learning algorithms, it provides insights that cannot be easily replicated manually.

For instance, a human operator might review a list of unconfirmed transactions over a specific period (e.g., a week) at regular intervals (e.g., every hour). The operator might compare these raw numbers and, noticing that the blockchain is responding slower, decide to provision a new node. The operator then initiates a vote to add the node. If the vote passes because all voters (previously deployed chain nodes) agree, the network's performance returns to normal.

The information source for this process originates from an API service. This service provides data including unconfirmed transaction counts and timestamps, which are stored in a database (e.g., MySQL, PostgreSQL, MongoDB). The machine learning algorithm reads from this database during each evaluation.

The machine learning algorithm defines "normal" transaction counts based on the collected information over a defined time period. When the algorithm detects an anomaly—such as an abnormal increase in unconfirmed transactions—it triggers a workflow to scale up the system by provisioning additional nodes. This workflow might be implemented by component 114 through executing a plurality of steps including, data collection (e.g., unconfirmed transaction counts and timestamps data may be continuously collected), normalizing and scoring (e.g., collected data may be normalized and scored, and compared to historical data to identify deviations from the norm), decision making (e.g., upon detecting an abnormal pattern, a vote is initiated to add new validation node), and execution (e.g., if the vote passes, new nodes are provisioned and integrated into the network, restoring optimal performance). By leveraging machine learning, the system 100 can efficiently manage the scaling of validation nodes, responding to changes in transaction volume much faster and more accurately than manual processes. This automated approach ensures the blockchain network remains resilient and performs optimally, even under varying loads and potential attack scenarios.

In some embodiments, system 100 may be configured to manage blockchain node health and incident responses using cloud infrastructure, artificial intelligence (AI), and interprocess communication (IPC). This system ensures optimal transaction processing capabilities and robust incident management through coordinated efforts of automated assistants and human interventions. It leverages artificial intelligence (AI) to enhance its capabilities, particularly through an AI node manager and other automated assistants. For example, the system 100 may implement a plurality of distinct intelligent automated assistants, each with specific roles and responsibilities, when managing network.

In some embodiment, the system may be designed to work closely with the cloud host (e.g., AWS, Oracle) infrastructure components (such as the Docker containers running the node managers and the network bridge).

Figure 4:
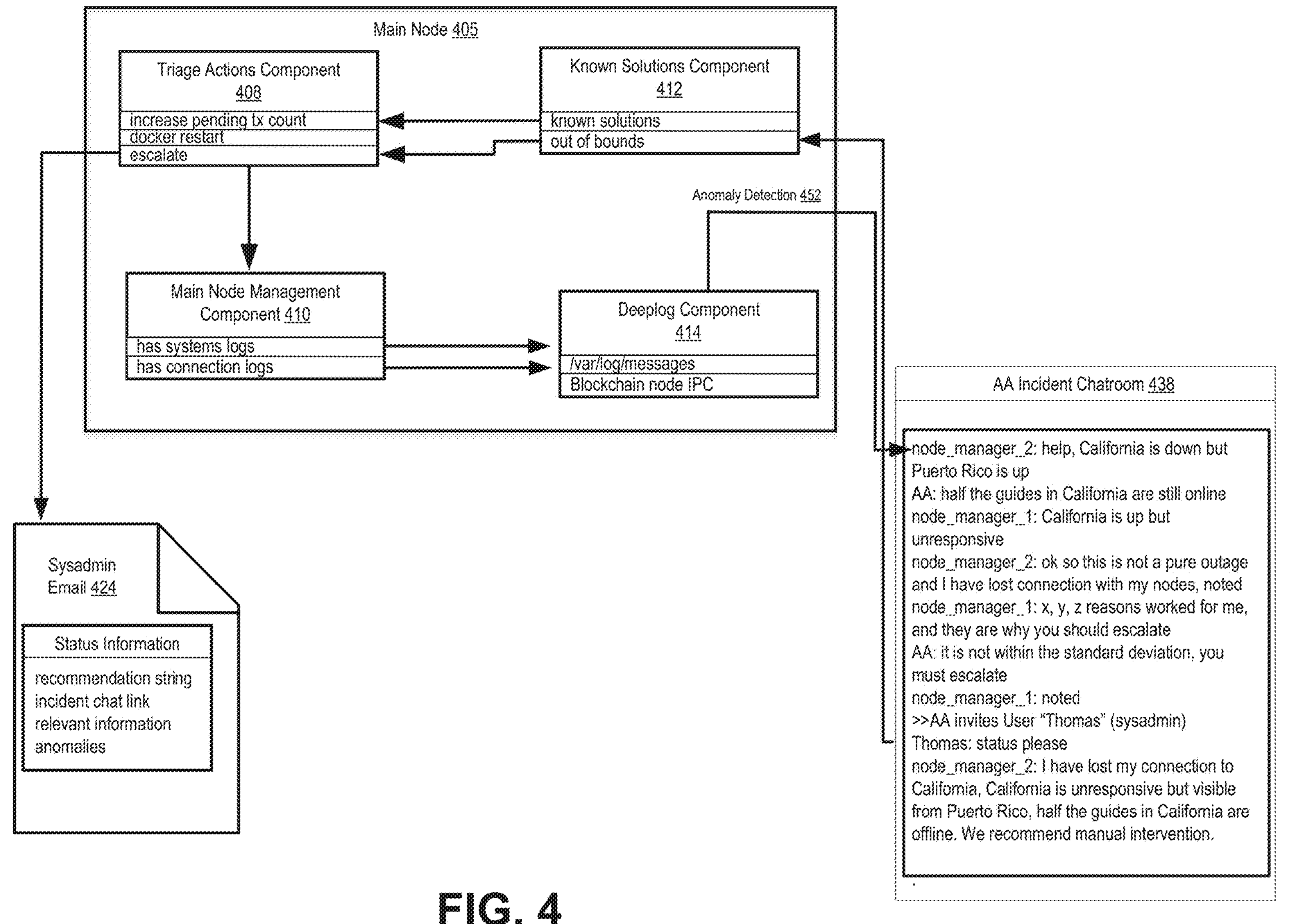
FIGS. 4-5 illustrate exemplary diagrams of functions for a blockchain node network, according to an implementation of the disclosure.

For example, as illustrated in FIG. 4, system 100 may include a main node 405. The main node 405 may include a triage actions component 408, a main node management component 410, a known solutions component 412, and a deeplog component 414. In some embodiments, the components may utilize IPC (Inter-Process Communication) to facilitate communication between processes on the same host.

The main node 405 facilities interaction between the system components and helps manage incidents by providing recommendations and escalating issues when necessary. For example, this interaction may include a conversation between a human user (e.g., a systems administrator) and an intelligent automated assistant ("AA") upon detection of certain network issues and to perform tasks related to maintaining validator node. AA may identify issues, communicates with node managers (other AAs), and makes triage decisions. For example, as illustrated in FIG. 1, user 150 may initiate node administrator application 135 (i.e., a client application running on client computing device) within client computing device 120. The application 135 may comprise a chat interface and may be configured to enable users (e.g., 150) to converse with an intelligent automated assistant ("AA") to perform a variety of tasks in furtherance of maintaining the number of validator nodes (e.g., 104, 106) within blockchain 145 to ensure optimal transaction processing capabilities.

Referring back to FIG. 4, the triage actions component 408 may be configured to perform automated tasks such as increasing the pending transaction count, docker restart, and issue escalation. For example, the triage actions component 408 may send status information, recommendations, incident chat links, relevant information, and anomaly alerts to the system administrator in a sysadmin email 424.

The main node management component 410 may be configured to collect system and detailed logs for analysis. The known solutions component 412 may be configured to manage known solutions and escalate out-of-bounds issues. The deeplog component 414 may be configured to include a deep neural network model using Long Short-Term Memory (LSTM) to model system logs as natural language sequences. This allows deeplog component 414 to automatically learn log patterns from normal execution and detect anomalies when log patterns deviate from the trained model. For example, deeplog component 414 may detect anomaly 452. The AA may identify and report anomaly 452 within the AA incident chatroom 438 for further action.

Figure 5:
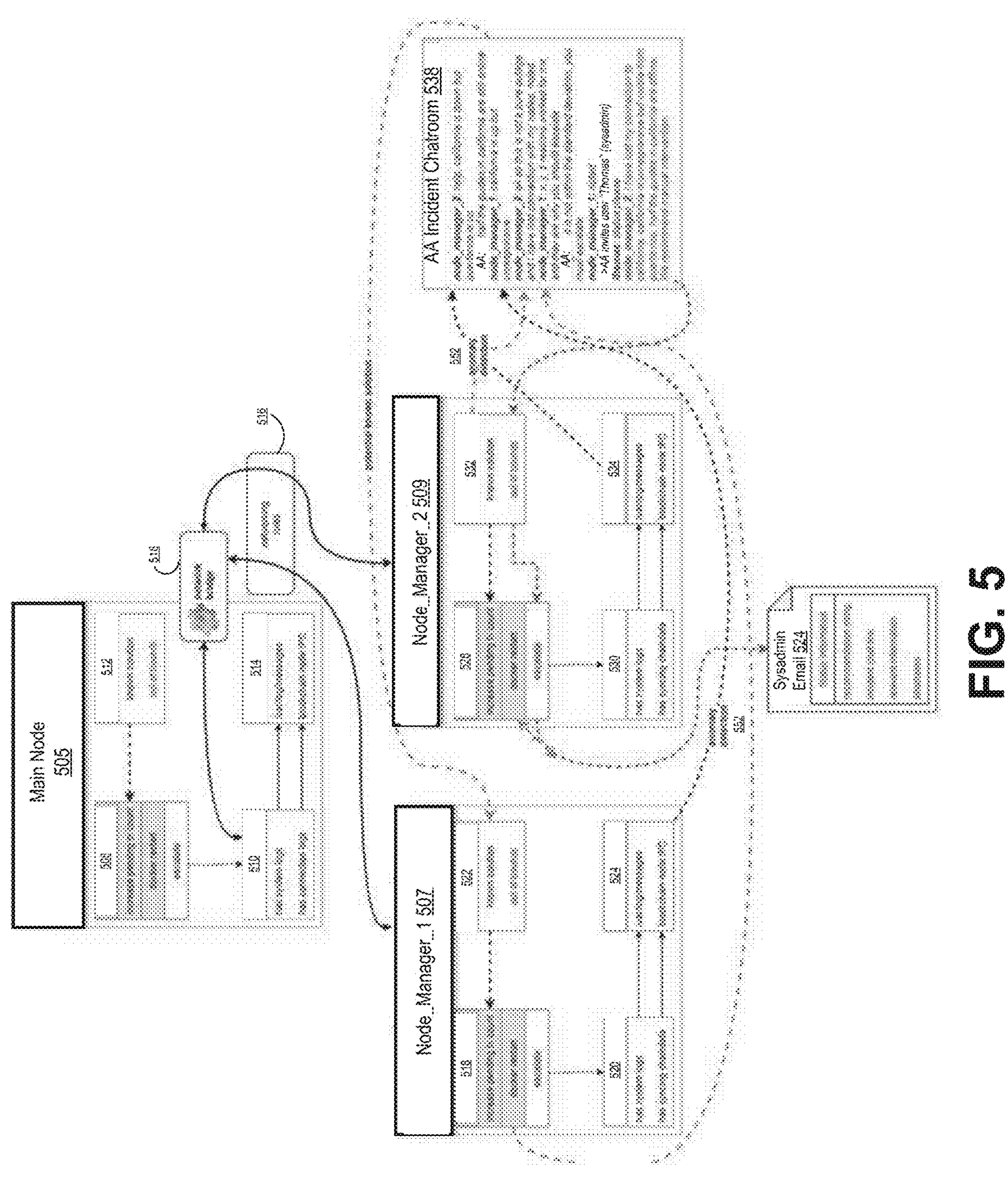

In some embodiments, the system 100 may comprise a plurality of specialized automated assistants (e.g., "Node Manager_1", "Node Manager_2", and so on) configured to identify issues and communicate those issues with other non-human automated assistants and human uses and make triage decisions; either repair the issue given a set of found solutions or escalate to a human to define known solutions. For example, as illustrated in FIG. 5, system 100 may include a main node 505 (e.g., main node 405 illustrated in FIG. 4), node manager_1 507, and node manager_2 509. The main node 505 may include a triage actions component 508, a main node management component 510, a known solutions component 512, and a deeplog component 514. The node manager_1 507 may include a triage actions component 518, a main node management component 520, a known solutions component 522, and a deeplog component 524. The node manager_2 509 may include a triage actions component 528, a main node management component 530, a known solutions component 532, and a deeplog component 534. The functions of the components 508-514, 518-524, and 528-234 may be similar to the functions of components 408-414 in FIG. 4.

The additional automated assistants facilitated by node manager_1 507 and node manager_2 509, respectively may identify issues, communicates with other non-human assistants (AA) and human users, and makes triage decisions. It may repair issues using known solutions or escalate them to humans for further resolution.

Humans are less accurate than trained machines, slow to react and need to sleep. For example, in the event of an outage, even the best people in the world can make mistakes.

Reacting to events within moments or escalate if that's impossible will save an incredible amount of time and money.

In some embodiments, node manager_1 507 and node manager_2 509 may be distinct from the system 100, autonomously managing end-user demand. They may be configured can handle random events that skew normal scaling patterns, using data to inform appropriate scaling actions, allowing the network to self-heal.

In some embodiments, node manager_1 507 and node manager_2 509 may receive and store data in a shared relational database from blockchain nodes within a region, including system logs. It can communicate with other machine-learning powered services, triage incidents, or escalate them to humans based on the information they have.

In some embodiments, a human user (e.g., a system or network manager) may use a conversational interface to obtain assistance from AA, node manager_1, and node manager_2.

Unlike an automated software agent focused on supporting IT staff and sysadmins with visual presentation of data and alerts, the present system is specific to blockchain network data and provides additional insights based on actual data.

In some embodiments, network bridge 518 may be configured to manages networking rules and ensures connectivity between nodes, supporting potential known solutions.

If a transaction does not clear, the system may store the transaction values on a local device and prompts the user to retry when service returns. Each successful transaction can be stored as a hash (using transaction values and timestamp) in the app's local cache and in a database associated with the user ID. This ensures the transaction cannot be performed more than once when service returns. Every transaction sent will check the server for this hash. On transaction finality, the hash is cleared from the local cache, so only the server retains it. If the transaction fails, only the end user has this hash. Transactions failing because the server has the hash will be cleared from the local cache.

The AI node manager can identify issues, communicate those issues with other managers, and make triage decisions; either repair the issue using known solutions or escalate to a human for defining solutions. Everything inside the cloud host box can be deployed with a single Docker container and set to auto-scale with Terraform. Managers communicate only by chat, compartmentalizing concerns and keeping nodes independent without direct data sharing.

Additionally, the present system provides assistance, e.g., through the automated addition of nodes. For example, the node manager may include a variety of functions for managing nodes. Everything inside the cloud host box can be deployed with a single Docker container and set to auto scale with terraform. Node managers may only communicate by chat, this compartmentalizes concerns such that each node remains independent, they do not share data directly to avoid learning from logs that may not represent an identical situation.

Figure 6:
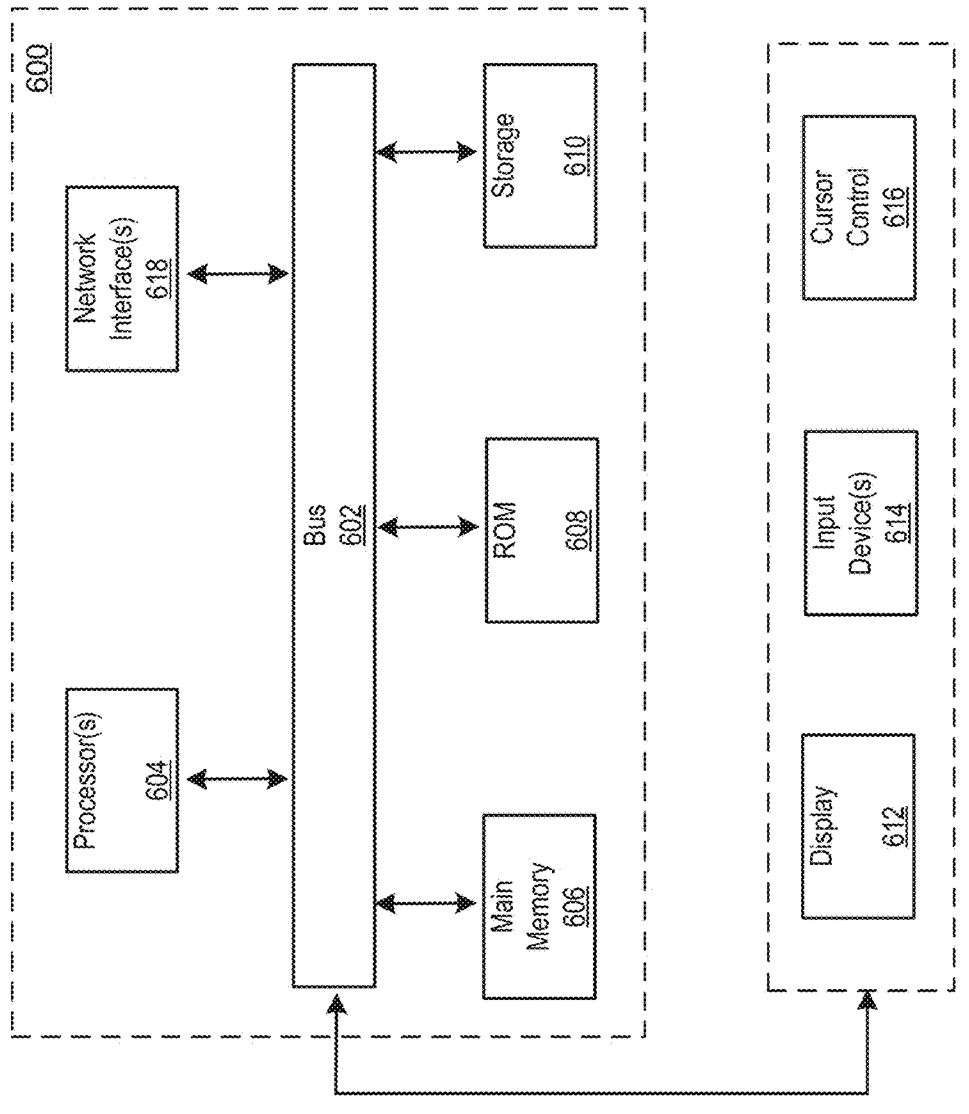
FIG. 6 illustrates an example computing system that may be used in implementing various features of embodiments of the disclosed technology.

The system can run both DeepLog and the Geth node within a single Dockerfile deployable. Docker facilitates automatic deployment for third parties that want to participate.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally. The bus 602 may also be connected to other components such as a display 612, input devices 614, or cursor control 616 to help facilitate interaction and communications between the processor and/or other components of the computing module 600.

Computing module 600 might also include one or more memory modules, simply referred to herein as main memory 606. For example, preferably random-access memory (RAM) or other dynamic memory might be used for storing information and instructions to be executed by processor 604. Main memory 606 might also be used for storing temporary variables or other intermediate information during execution of instructions to be executed by processor 604. Computing module 600 might likewise include a read only memory ("ROM") 608 or other static storage device 610 coupled to bus 602 for storing static information and instructions for processor 604.

Computing module 600 might also include one or more various forms of information storage devices 610, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to or accessed by media drive. As these examples illustrate, the storage media can include a computer usable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit and a storage unit interface. Examples of such storage units and storage unit interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module 600.

Computing module 600 might also include a communications interface or network interface(s) 618. Communications or network interface(s) interface 618 might be used to allow software and data to be transferred between computing module 600 and external devices. Examples of communications interface or network interface(s) 618 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications or network interface(s) 618 might typically be carried on signals, which can be electronic, electromagnetic (which includes optical) or other signals capable of being exchanged by a given communications interface. These signals might be provided to communications interface 618 via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 606, ROM 608, and storage unit interface 610. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for scaling nodes in a blockchain network, the method comprising:

collecting historical node data comprising historical unconfirmed transaction counts and associated timestamps for each node;

applying a normalizing algorithm to the collected historical node data;

training a selected machine learning algorithm on the normalized collected node data;

executing the trained machine learning algorithm to determine a number of unconfirmed transactions to occur within a time period within; and establishing a threshold based on the determined number of unconfirmed transactions to occur within the time period;

continuously monitoring a current count of unconfirmed transactions for each node by applying the established threshold;

upon determining that the current count of unconfirmed transactions for each node exceed the established threshold, initiating a vote for adding a new node; and upon the vote passing, adding the new node into the network, wherein the new node is a voter node.

2. The method of claim 1, upon determining that the current count of unconfirmed transactions for each node exceed the established threshold, automatically generating a new network address configured to accommodate increased transaction volume, wherein the new address is designated as a signer node.

3. The method of claim 1, wherein the unconfirmed transaction count comprises a number of validated transactions that have been broadcasted to the blockchain network but not yet included in a block.

4. The method of claim 1, wherein the applying the normalizing algorithm to the collected historical node data comprises applying a zero-tolerance policy.

5. The method of claim 1, wherein the applying the normalizing algorithm to the collected historical node data comprises applying a win condition.

6. The method of claim 1, wherein the normalized collected historical node data is stored in a structured table.

7. The method of claim 1, wherein the blockchain network comprises a plurality of nodes.

8. A system for scaling nodes in a blockchain network, the system comprising:

one or more computing processors; and a machine-readable storage medium storing instructions that, when executed by the one or more processors, cause the system to:

collect historical node data comprising historical unconfirmed transaction counts and associated timestamps for each node;

apply a normalizing algorithm to the collected historical node data;

train a selected machine learning algorithm on the normalized collected node data;

execute the trained machine learning algorithm to determine a number of unconfirmed transactions to occur within a time period within; and establish a threshold based on the determined number of unconfirmed transactions to occur within the time period;

continuously monitor a current count of unconfirmed transactions for each node by applying the established threshold;

upon determining that the current count of unconfirmed transactions for each node exceeds the established threshold, initiate a vote for adding a new node; and upon the vote passing, add the new node into the network, wherein the new node is a voter node.

9. The system of claim 8, upon determining that the current count of unconfirmed transactions for each node exceed the established threshold, automatically generate a new network address configured to accommodate increased transaction volume; wherein the new address is designated as a signer node.

10. The system of claim 8, wherein the unconfirmed transaction count comprises a number of validated transactions that have been broadcasted to the blockchain network but not yet included in a block.

11. The system of claim 8, wherein the normalizing algorithm applied to the collected historical node data comprises applying a zero-tolerance policy.

12. The system of claim 8, wherein the normalizing algorithm applied to the collected historical node data comprises applying a win condition.

13. The system of claim 8, wherein the normalized collected historical node data is stored in a structured table.

14. The system of claim 8, wherein the blockchain network comprises a plurality of nodes.

* * * * *